(12) United States Patent
Batchelor

(10) Patent No.: US 6,783,040 B2
(45) Date of Patent: Aug. 31, 2004

(54) PORTABLE ELECTRONIC DEVICE DETACHABLE VEHICLE MOUNTING AND VEHICLE USE SYSTEMS

(76) Inventor: Jeffrey Lyle Batchelor, 5916 Roberts Common Ct., Burke, VA (US) 22015-2801

( * ) Notice: Subject to any disclaimer, the term of this patent is extended or adjusted under 35 U.S.C. 154(b) by 84 days.

(21) Appl. No.: 10/230,278

(22) Filed: Aug. 29, 2002

(65) Prior Publication Data

US 2004/0040992 A1 Mar. 4, 2004

(51) Int. Cl.$^7$ ................................................ B62J 11/00
(52) U.S. Cl. ...................... 224/413; 224/406; 224/408; 224/419; 224/431; 224/435; 224/463; 224/929; 280/288.4
(58) Field of Search .................................. 224/413, 406, 224/408, 419, 430, 431, 433, 435, 447, 463, 572, 929; 280/762, 769, 288.4; 296/37.1, 78.1; 381/86; 455/345; 439/34

(56) References Cited

U.S. PATENT DOCUMENTS

| | | | |
|---|---|---|---|
| 1,413,530 A | | 4/1922 | Harned |
| 2,536,071 A | | 1/1951 | McClung |
| 2,588,671 A | | 3/1952 | Tringali |
| 3,944,924 A | | 3/1976 | Miyachi |
| 3,947,954 A | | 4/1976 | Weiler |
| 4,059,207 A | | 11/1977 | Jackson et al. |
| 4,250,770 A | | 2/1981 | Robertson, Jr. |
| 4,359,233 A | | 11/1982 | Jackson et al. |
| 4,436,350 A | | 3/1984 | Jolin |
| 4,445,228 A | | 4/1984 | Bruni |
| 4,469,256 A | | 9/1984 | McEwen |
| 4,473,251 A | | 9/1984 | Murayama |
| 4,558,460 A | * | 12/1985 | Tanaka et al. ................. 381/86 |
| 4,573,573 A | | 3/1986 | Favaro |
| 4,600,208 A | * | 7/1986 | Morishima ............... 280/288.4 |
| 4,687,072 A | | 8/1987 | Komuro |
| 4,750,658 A | | 6/1988 | Jennings |
| 4,766,980 A | | 8/1988 | Engle |
| 4,796,716 A | | 1/1989 | Masuda |
| 4,856,364 A | | 8/1989 | Dixon |
| 4,981,243 A | | 1/1991 | Rogowski |
| 5,001,779 A | | 3/1991 | Eggert et al. |
| 5,044,993 A | * | 9/1991 | El-Haj et al. ................. 439/34 |
| 5,114,060 A | | 5/1992 | Boyer |
| 5,222,752 A | | 6/1993 | Hewitt |
| 5,277,427 A | | 1/1994 | Bryan et al. |
| 5,286,130 A | | 2/1994 | Mueller |
| 5,419,478 A | | 5/1995 | Mauro et al. |
| 5,458,647 A | | 10/1995 | Brochier et al. |

(List continued on next page.)

OTHER PUBLICATIONS www.tanktunes.com(26 pages), E & E Products.

*Primary Examiner*—Gary E. Elkins
(74) *Attorney, Agent, or Firm*—Hunton & Williams LLP

(57) ABSTRACT

Systems for mounting and using portable electronic devices (PEDs) on vehicles make PEDs easier to secure to, transport on, and protect from the elements while mounted on the vehicle. One embodiment of a mounting system includes a PED cabinet having a hard, weatherproofed outer shell with the PED mounted therein, a harness system which detachably mounts the PED cabinet, and an anchor system which detachably mounts the harness system to the vehicle. The harness system may include a strap which wraps around the top of the PED cabinet to firmly hold the PED cabinet in place on a harness pad part of the harness system. The anchor system may include straps which connect to the motorcycle rearward of a motorcycle's gas tank and additional straps which connect to the motorcycle forward of the motorcycle's gas tank. The PED cabinet may include adjustable speakers mounted thereon. An accessory bar can be mounted to the vehicle. PEDs can be mounted to the accessory bar, and power outlets can be mounted to the accessory bar for powering PEDs on the vehicle.

31 Claims, 6 Drawing Sheets

U.S. PATENT DOCUMENTS

| | | |
|---|---|---|
| 5,487,497 A | 1/1996 | Kwiatkowski |
| 5,542,589 A * | 8/1996 | McKee .................. 224/929 |
| 5,556,222 A | 9/1996 | Chen |
| 5,651,485 A | 7/1997 | Impastato, II |
| 5,664,716 A | 9/1997 | Nuckolls |
| 5,732,965 A | 3/1998 | Wiley |
| 5,771,305 A | 6/1998 | Davis |
| 5,823,557 A | 10/1998 | Penza |
| 5,829,656 A | 11/1998 | Reitz et al. |
| 5,842,714 A * | 12/1998 | Spector ............... 280/288.4 |
| 5,881,936 A | 3/1999 | Li |
| 5,897,040 A | 4/1999 | Ward |
| 6,017,071 A | 1/2000 | Morghen |
| 6,022,164 A | 2/2000 | Tsui et al. |
| 6,029,874 A | 2/2000 | Meggitt |
| 6,138,533 A | 10/2000 | Turtle |
| 6,176,339 B1 | 1/2001 | Reichardt |
| 6,305,590 B1 * | 10/2001 | Hayes .................. 224/419 |
| 6,561,400 B2 * | 5/2003 | Lee ..................... 224/413 |

* cited by examiner

PORTABLE ELECTRONIC DEVICE DETACHABLE VEHICLE MOUNTING AND VEHICLE USE SYSTEMS

BACKGROUND OF THE INVENTION

1. Field of the Invention

The field of this invention is systems for the detachable mounting and use of portable electronic devices on vehicles. More specifically, the field of this invention is systems for detachably mounting and using portable electronic devices such as radios, CD players, cassette tape players, video cameras, two-way or CB radios, or telephones onto open vehicles such as motorcycles, snowmobiles, personal watercraft, etc.

2. Description of Related Art

Many devices have been proposed for assisting in the mounting and use of portable electronic devices on vehicles such as motorcycles which may not be initially equipped by the manufacturer with certain portable electronic devices. The device in U.S. Pat. No. 5,001,779 to Eggert et al. is exemplary. The device in the Eggert patent employs a soft-sided bag or box to hold a portable radio and speakers on a motorcycle. The Eggert device suffers, however, from several substantial drawbacks. For one, the speakers on the Eggert device do not enjoy any degree of adjustability relative to the rest of the bag or box. The Eggert device is not as easily detachable and attachable to the motorcycle as would be desired. Further, the Eggert device is not very securely mounted on the motorcycle. Because of the way it is mounted, it is possible for the bag or box to slide to either side of the motorcycle's fuel tank. Also, the Eggert device and some of the other proposed devices in the prior art are not as easily adapted, as would be desirable, to carry portable electronic devices of different sizes and configurations.

Neither the Eggert patent nor any of the other prior art disclosures show a universal accessory mounting bar for assisting in the mounting of small portable electronic devices to vehicles. Also, neither the Eggert patent nor any of the other prior art disclosures show a convenient method for powering portable electronic devices mounted to vehicles such as motorcycles.

SUMMARY OF THE INVENTION

One embodiment of the invention is a portable electronic device (PED) detachable mounting system for detachably mounting a PED to one of a motorcycle, a snowmobile, a personal watercraft, a personal three- or four-wheeled off-road vehicle, or other similar vehicle. The PED detachable mounting system comprises a PED cabinet comprising a weatherproofed, protective outer shell, a PED enclosed within the outer shell such that the PED is rendered weatherproof thereby, and at least one speaker adjustably mounted to the outer shell such that the direction of sound emittance from the at least one speaker can be adjusted to a plurality of positions while the at least one speaker remains mounted to the outer shell. The PED detachable mounting system also comprises a harness system adapted to detachably secure the PED cabinet to a vehicle selected from the group consisting of a motorcycle, a snowmobile, a personal watercraft, a personal three- or four-wheeled off-road vehicle, or other similar vehicle.

Another embodiment of the invention is a mounting system for detachably mounting a portable electronic device (PED) to a vehicle comprising a PED cabinet comprising a weatherproofed, protective outer shell, and a PED enclosed within the outer shell such that the PED is rendered weatherproof thereby. The mounting system also comprises a harness pad adapted to detachably mount the PED cabinet to the harness pad, and an anchor system comprising a first anchor strap adapted to be secured to a first position on a vehicle, the first anchor strap being further adapted to be releasably secured to the harness pad, and a second anchor strap adapted to be secured to a second position on the vehicle, the second anchor strap being further adapted to be releasably secured to the harness pad, wherein the PED cabinet may be detached from the vehicle leaving only the harness pad and the anchor system attached to the vehicle, and the PED cabinet and the harness pad can be detached together from the vehicle leaving only the anchor system attached to the vehicle.

Another embodiment of the invention is a mounting system for securing a portable electronic device (PED) to a vehicle comprising a PED cabinet comprising a weatherproofed, protective outer shell, and a PED enclosed within the outer shell such that the PED is rendered weatherproof thereby. The mounting system also comprises a harness system comprising a harness base adapted to be releasably secured to a vehicle, a bottom surface of the outer shell lying on the base, and a first strap attached to the harness base, the first strap passing over a top surface of the outer shell which is opposite the bottom surface thereof such that when the PED cabinet is mounted to the harness base the first strap holds the PED cabinet on the harness base.

Another embodiment of the invention is a combination of a motorcycle and an accessory mounting bar having at least one power outlet attached thereto, the combination comprising a motorcycle, a bar having an adjustable length, the bar comprising a first end mounted to the motorcycle, and a second end mounted to the motorcycle, and at least one power outlet mounted to the bar, the power outlet being connected to an electrical power system of the motorcycle.

Another embodiment of the invention is a method of utilizing portable electronic devices (PEDs) on a motorcycle comprising the steps of attaching an accessory bar to a motorcycle, attaching an outlet to the accessory bar, electrically connecting the outlet to an electrical system of the motorcycle, and electrically connecting a PED to the outlet to provide power to the PED.

DETAILED DESCRIPTION OF THE INVENTION

For the sake of convenience and clarity, the principles of the invention will be described with reference to the specific embodiments of the invention depicted in the accompanying illustrations. However, it should be understood that the specific embodiment depicted is meant to be illustrative of the invention's principles. Describing the invention through use of a single specific embodiment is not meant to limit the scope of the invention to the specific embodiment. The scope of the invention is set forth in, and should be measured by, the accompanying claims.

The invention relates to systems for detachably mounting and using portable electronic devices (PEDs) on vehicles. By way of example, a portable electronic device includes a radio, a CD player, a cassette tape player, a television, a video camera, two-way or CB radios, a telephone, a radar detector, a GPS reader, or other like devices of similar size, weight and purpose. The term PED is used herein broadly to encompass any of these devices which may be desirable to use on or with a vehicle.

More specifically, the invention relates to systems for detachably mounting and using PEDs on open vehicles. An open vehicle includes, by way of example, a motorcycle, three- and four-wheeled all-terrain vehicles (ATVs), a snowmobile, a personal watercraft such as a wave runner or jet ski, or other like vehicles. These vehicles are for use typically by only one operator and possibly a small number of passengers, and are characterized by an absence of an enclosure separating the operator or passengers from the atmosphere and surrounding environment. The lack of an enclosure also means that instruments mounted to the vehicle for access and use by the operator or passengers are not protected against the elements, and are not secured against access by others, including thieves or vandals. If a PED is to be mounted to these vehicles for access and use by the operator or passengers, the PED should have provisions for protecting it from the surrounding environment, and for securing it against unauthorized access.

Figure 1:
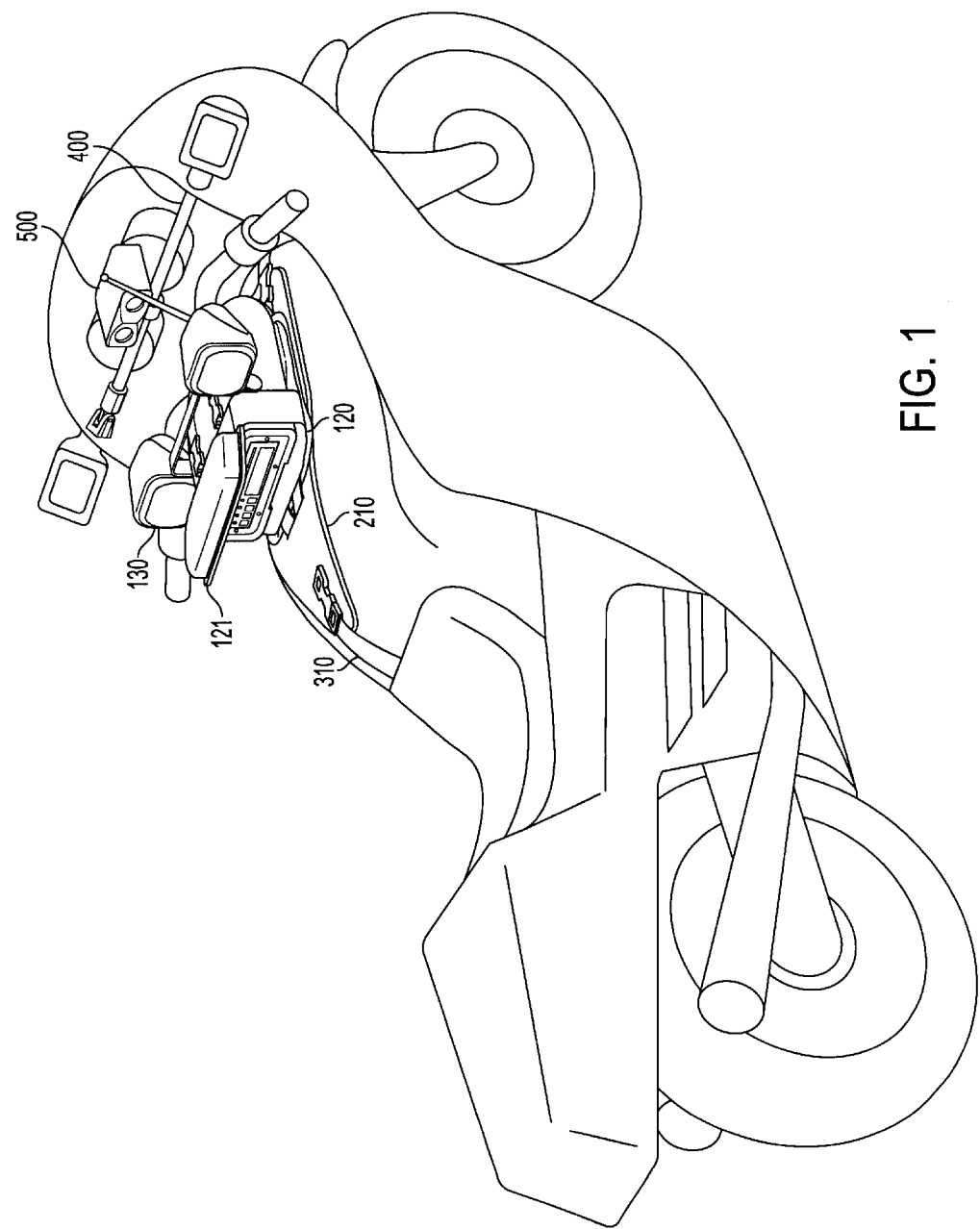
FIG. 1 is an schematic view of one exemplary vehicle, a motorcycle, with exemplary portable electronic device mounting and use systems accompanying a portable electronic device.
Figure 2:
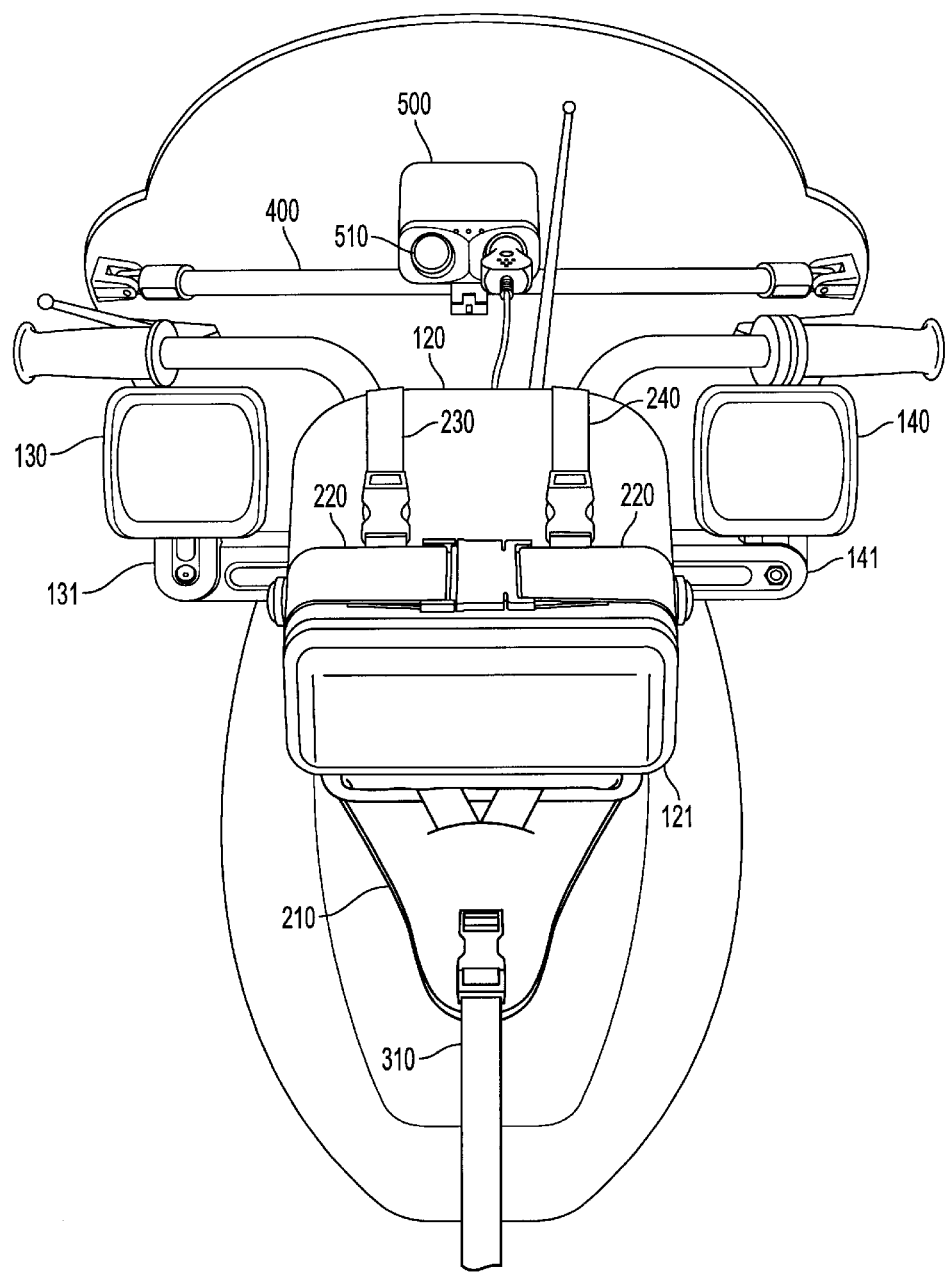
FIG. 2 is an schematic view of the motorcycle of FIG. 1 taken from the perspective of an operator sitting upon the motorcycle and showing exemplary embodiments of the invention mounted upon the motorcycle.
Figure 3:
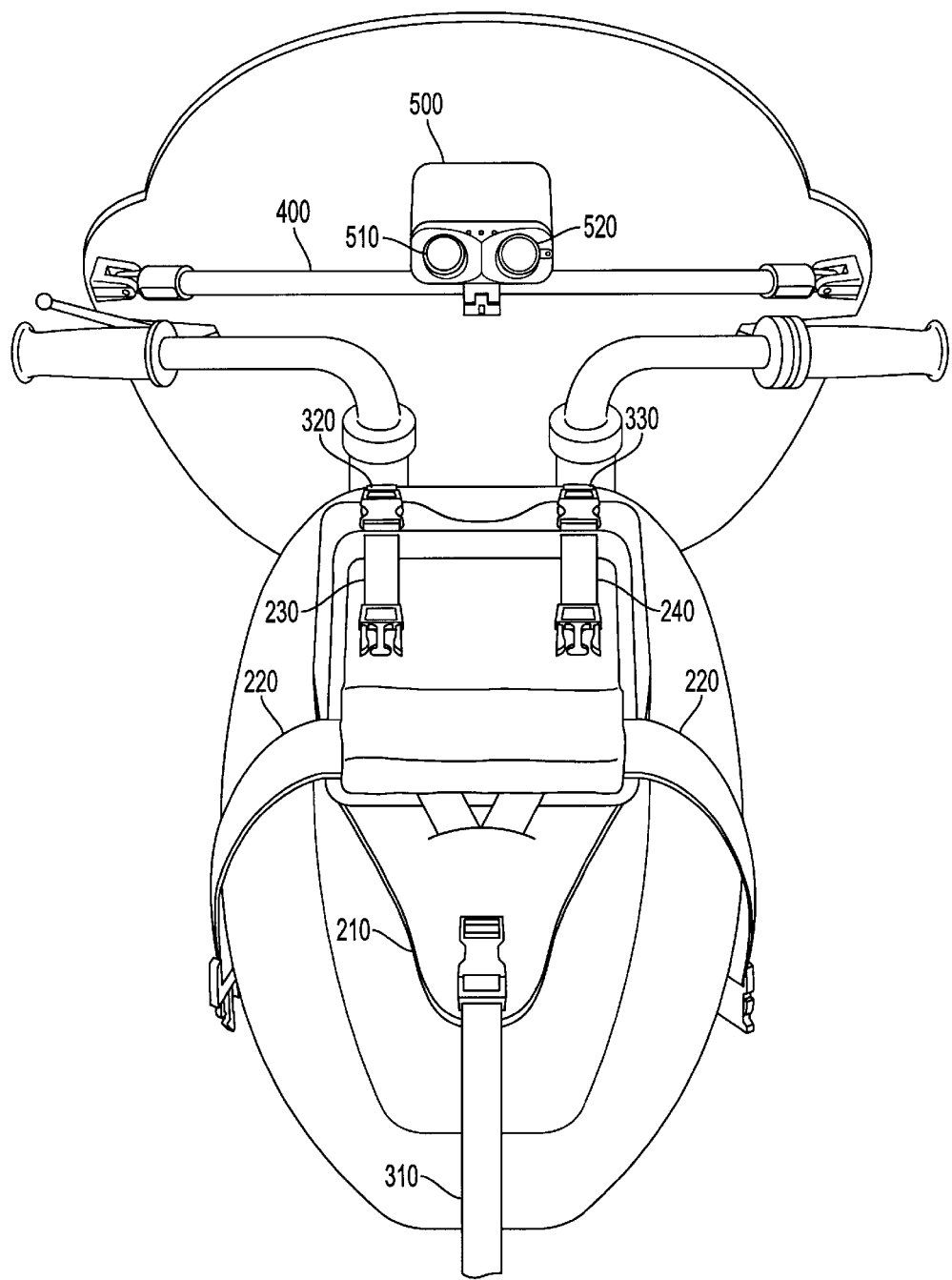
FIG. 3 is an schematic view taken from the same perspective as the view in FIG. 2. Here, however, the portable electronic device cabinet has been removed to better view other components of the mounting system.

The illustrated embodiment includes systems for detachably mounting and using a portable radio on a motorcycle. The principles of the invention are equally and in a similar manner applicable to other types of PEDs and to other types of vehicles. FIGS. 1 and 2 illustrate from two separate perspectives a motorcycle with a PED mounted thereon. FIG. 3 shows the same perspective as FIG. 2, but a portion of the mounting system has been removed for illustrative purposes. As most easily seen in FIG. 4, the illustrated mounting system comprises a PED cabinet 100, a harness system 200, and an anchor system 300.

The PED cabinet 100 comprises a weatherproofed outer shell 120 which is adapted for mounting on the inside thereof the PED 110. The PED 110 is made weatherproof by mounting it inside of the outer shell 120. Provision can be made for wires, antennas, etc. which may be necessary for the functioning of the PED 110 to pass through the outer shell 120 with the outer shell remaining weatherproofed. In the illustrated embodiment, antenna 111 is mounted to the outer shell 120 and its connection thereto is made weatherproof through any of a number of known methods. In the illustrated embodiment, the outer shell 120 is also made from a rigid, non-deformable material to protect the PED 110 from damage caused by dropping, bumping, etc. The PED 110 may be mounted in the outer shell 120 with foam rubber or another soft material interposed between the PED and the outer shell. This will help further protect the PED 110 from being damaged while it is inside the outer shell 120. The illustrated embodiment also includes an at least partially translucent, hinged front face plate 121. The front face plate 121 opens to allow the operator access to the PED 110. When the front face plate 121 is closed, it can seal the open end of the outer shell 120 by, for example, providing a gasket between the face plate 121 and the outer shell 120. Because it is translucent, the front face plate 121 allows the operator to at least partially view the PED 110 when the front face plate 121 is closed.

In the illustrated embodiment, the PED cabinet 100 also has attached thereto two speakers 130, 140. The speakers 130, 140 are themselves weatherproofed and attach to the outer shell 120 via speaker mounting brackets 131, 141 (see FIG. 2). One or several hinged joints in the speaker mounting brackets 131, 141, or at the connection of the speaker mounting brackets 131, 141 to the speakers 130, 140 or to the outer shell 120, permit adjustments to the orientation of the speakers 130, 140, and consequently adjustment of the direction of sound emitted from the speakers. This adjustability of the speakers 130, 140 is advantageous so that the sound can be directed either to the operator when riding on the motorcycle, to the side of the motorcycle so that listeners around the motorcycle can enjoy music when the motorcycle is parked, or to any other desirable position.

Alternatively, the speakers 130, 140 could be mounted integral with and partially inside of the outer shell 120. However, such a mounting arrangement would restrict or prevent the adjustment of the orientation of speakers 130, 140 relative to the PED cabinet 100. Also, while two speakers are shown in the illustrated embodiment, a single speaker, or more than two speakers may be provided, as desired.

Figure 4:
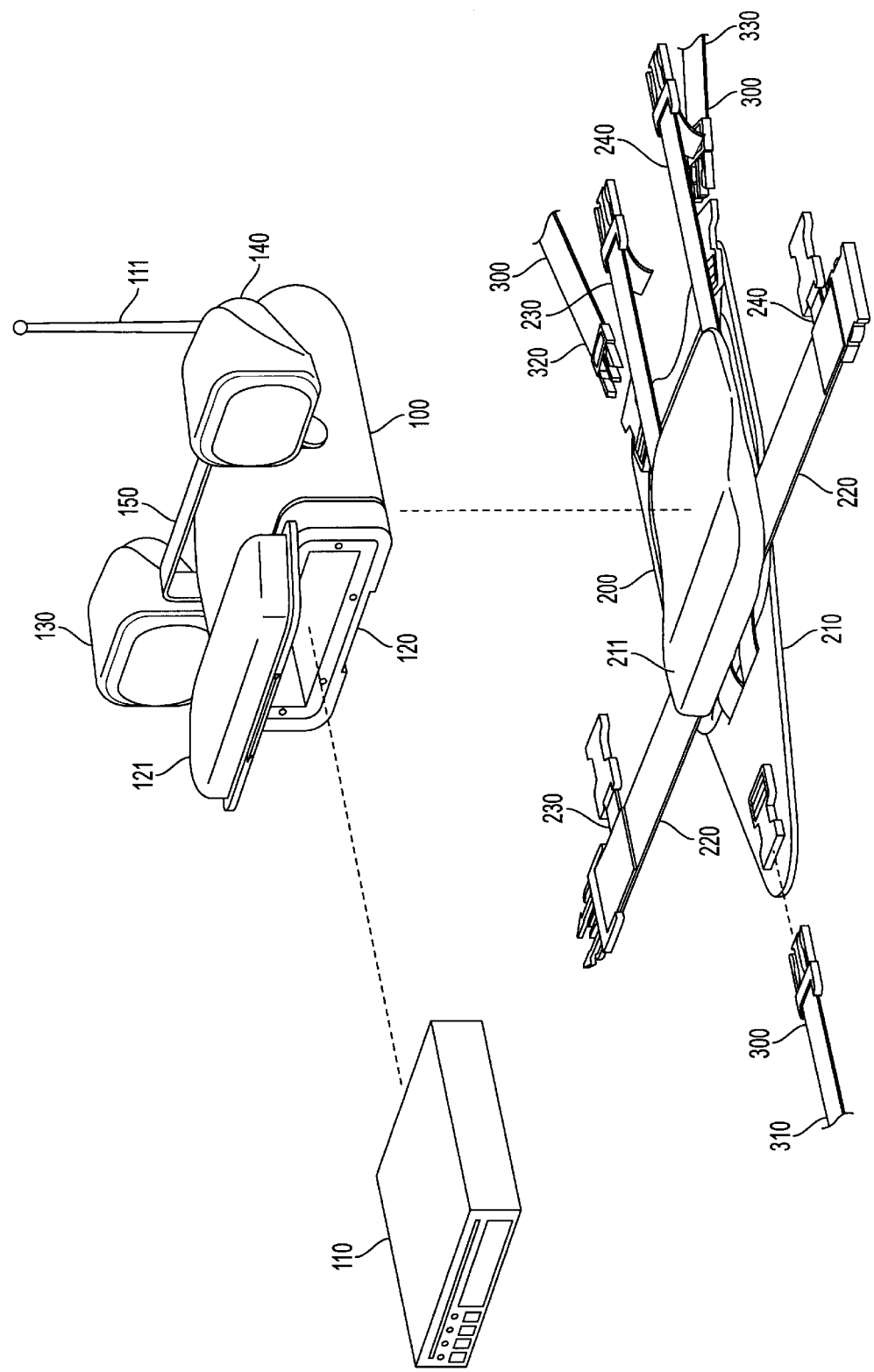
FIG. 4 is an exploded, schematic view of several components of the mounting system.
Figure 5:
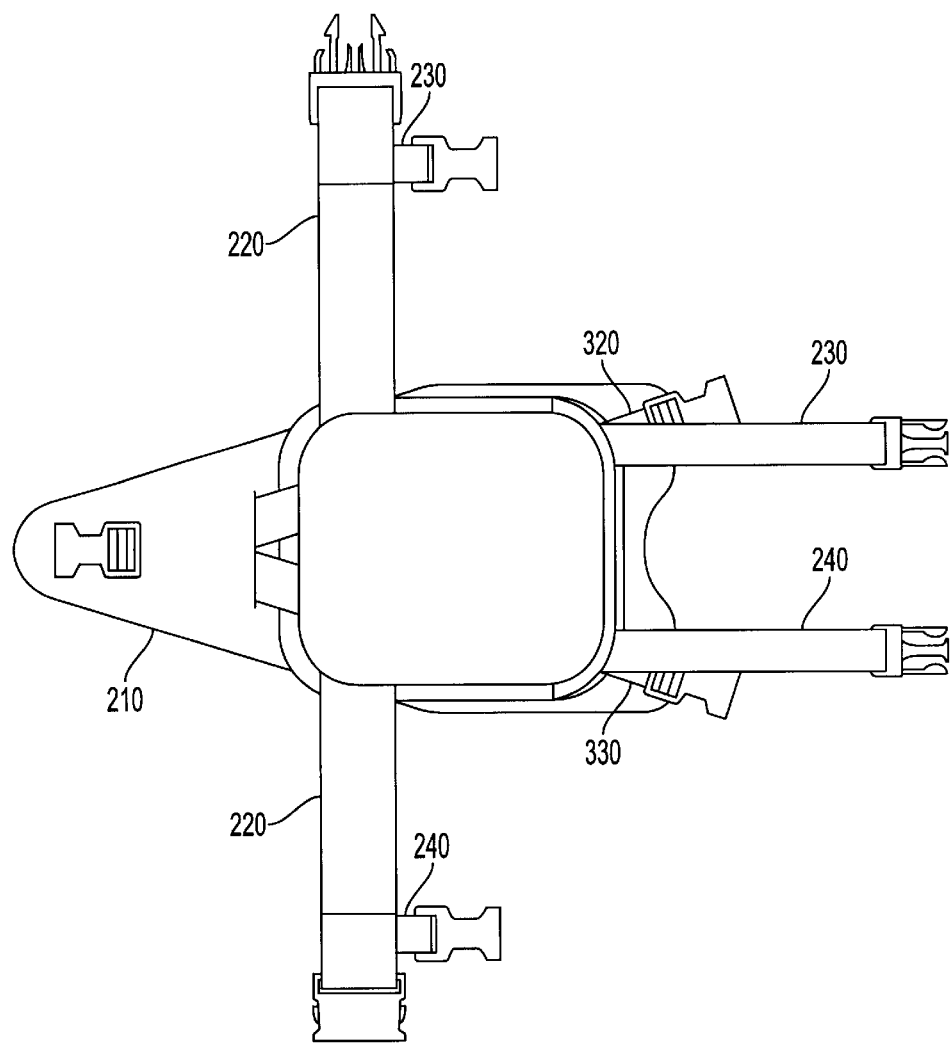
FIG. 5 is a plan view of the harness system of the mounting system.

The outer shell 120 could also have attached thereto a carrying handle 150 to facilitate carrying the PED cabinet 100 when it is not mounted to a vehicle. FIG. 4, for example, shows the PED cabinet 100 with a carrying handle 150 and FIG. 2 shows a version of the PED cabinet 100 without a carrying handle. Because the PED cabinet 100 is easily and fully detachable from the rest of the mounting system (as will be discussed below) when, for example, the operator wishes to keep the PED in a more secure a location off of the motorcycle, the carrying handle 150 helps the operator to carry the PED cabinet 100. Also, the PED cabinet 100 and the PED 110 can be conveniently used even when not mounted to a vehicle such as a motorcycle. During such use away from the vehicle, the carrying handle 150 would be advantageous for helping to transport the PED cabinet 100.

The harness system 200 detachably mounts the PED cabinet 100 to the motorcycle. The harness system 200 comprises a centrally located harness pad 210, and several straps which extend therefrom. The harness pad 210 is preferably made of a relatively soft material. When mounted on the motorcycle, the harness pad 210 will lay between the bottom of the PED cabinet 100 and the motorcycle. If the harness pad 210 is made of a soft material, it can help cushion the PED cabinet 100 against any hard surfaces on the motorcycle in order to prevent scratches and damage both to the PED cabinet 100 and the motorcycle. The harness pad 210 also functions to properly position the straps which act to mount the PED cabinet 100 to the harness system 200, and mount the harness system 200 to the motorcycle. The harness pad 210 may also be partially molded or shaped to conform to the profile of the motorcycle surface upon which it sits, and/or to conform to surface of the outer shell 120 of the PED cabinet 100 for a more stable and secure fit. In the illustrated embodiment, the harness pad 210 includes a pillow 211 whose front portion (which would be underneath the front of the PED 110 when the PED cabinet 100 is mounted on the harness system 200) is thicker than the remainder of the harness pad 210 in order to position the PED cabinet 100 so that it is tilted slightly upwards toward the operator. This helps the operator to see the controls on the PED 110 while operating the motorcycle.

In order to securely hold the PED cabinet 100 to the harness system 200, a first strap 220 extends outward from opposite sides of the harness pad 210 with a male and a female buckle secured to the two ends of the first strap 220, respectively. As shown in FIG. 2, the first strap 220 is adapted to wrap over the top surface of the PED cabinet 100 to securely hold the PED cabinet 100 to the harness pad 210 by pushing the PED cabinet 100 against the harness pad 210. The length of the first strap 220 is adjusted to provide a firm fit of the first strap 220 around the PED cabinet 100. This method helps achieve a very solid connection between the PED cabinet 100 and the motorcycle, preventing much of the relative movement inherent in prior art mounting systems for PEDs on motorcycles.

In the illustrated embodiment, buckles are used to provide a connection at one end of a strap to another end. These buckles can be of the molded plastic variety widely known and commonly used. However, other fasteners such as clasps and snaps could, of course, also be used, as desired.

In the illustrated embodiment, in addition to the first strap 220 for mounting the PED cabinet 100 to the harness pad 210, second and third straps 230, 240 are also provided. Each of the second and third straps 230, 240 is attached at one end thereof to the harness pad 210, and at the opposite end to the first strap 220, with a buckle provided intermittent the two ends of each strap. Each of the second and third straps wraps around the back portion of the PED cabinet 100, opposite the front face plate 121. The second and third straps are arranged roughly perpendicular to the first strap 220. These optional, additional second and third straps 230, 240 also help to hold the PED cabinet to the harness pad 210. Instead, one additional strap or more than two additional straps may be used, and their ends may attach at different locations to the harness system 100, as appropriate for the particular PED cabinet.

It is possible for the harness system to be mounted directly to the motorcycle. For example, the harness system may include additional motorcycle mounting straps (not shown) which are directly and permanently attached to locations on the motorcycle to hold the harness pad in position. Possibly the harness pad could be glued onto a surface of the motorcycle or use some other method of directly attaching the harness pad to the motorcycle. However, in the illustrated embodiment, an anchor system 300 is structurally interposed between the harness system 200 and the motorcycle for the reasons discussed below.

An anchor system 300 in the illustrated embodiment detachably mounts the harness system 200 to the motorcycle. The anchor system 300 comprises straps which are directly mounted to the motorcycle on one end thereof and mounted to the harness system 200 on the opposite ends. In the illustrated embodiment, the anchor system comprises a first strap 310, a second strap 320 and a third strap 330. The first strap 310 is secured to the motorcycle at a point generally between the operator's seat and the fuel tank. The second strap 320 and the third strap 330 are each secured at some point on the motorcycle ahead of the fuel tank and in the vicinity of the triple clamp. If desired, the second strap 320 and third strap 330 may comprise a single strap which is secured to the motorcycle by wrapping around the motorcycle's frame in the vicinity of the gas tank or by wrapping around the motorcycle's triple clamp. Each of the straps can be secured to the motorcycle with any of a number of suitable and known fasteners. For example, the straps may be attached to the motorcycle with a screw and a washer. Each of the first strap 310, the second strap 320 and the third strap 330 is secured to the harness system 200 at its end opposite its attachment to the motorcycle.

The exact location of attachment of each of these straps to the motorcycle is not critical. However, an advantageous arrangement is illustrated in the figures where the first strap 310 pulls on the harness system 200 in a first direction and the second strap 320 and third strap 330 pull on the harness system 200 in a second direction generally opposite the first direction. This arrangement helps achieve a stable and secure connection of the harness system 200 and PED cabinet 100 to the motorcycle.

In the illustrated embodiment, the first strap 310, the second strap 320 and the third strap 330 are secured to the harness system 200 via releasable buckles. Of course, some other mechanism, besides buckles, for accomplishing a releasable attachment between the straps and the harness system could also be used, as desired. The presence of an anchor system 300 detachably mounting the harness system 200 has several advantages. With this arrangement, the operator has the option of either removing the PED cabinet 100 from the harness system 200 and leaving the harness system 200 and the anchor system 300 attached to the motorcycle (as shown in FIG. 3), or removing the PED cabinet 100 and the harness system 200 together, and leaving only the anchor system 300 on the motorcycle. The anchor system 300 is relatively small and unobtrusive so that it will not get in the way of operating the motorcycle when it is left on the motorcycle without the PED cabinet 100 or harness system 200. The harness system 200 is somewhat more obtrusive and it may not always be desirable to leave the harness system 200 on the motorcycle when the PED cabinet 100 is not being carried. Thus, it is advantageous to be able to easily and quickly remove the harness system 200 when the PED cabinet 100 is not being carried. On the other hand, because the anchor system 300 is unobtrusive and can be left on the motorcycle, it can provide an easy and quick means for reattaching the harness system 200 and PED cabinet 100.

The separate PED cabinet, harness system and anchor system result in a modular mounting system. It may be possible for the operator to obtain several PED cabinets, each specially modified for a specific PED, including different harness systems 200 for each PED cabinet specially adapted to fit the particular PED cabinet. In this case, this anchor system arrangement would allow easy and quick swapping on the motorcycle of one PED cabinet and harness system for another. Such would not be the case if the harness system were permanently attached to the motorcycle.

Further, such a modular mounting system permits a manufacturer of this invention to produce several versions of the anchor system individually adapted to work with specific models of motorcycles, with each version of the anchor system capable of accompanying a standard harness system. The harness system could also, of course, be produced in several different versions each adapted to a specific PED cabinet, and each individual harness system capable of accompanying a standard anchor system. Alternatively, both the anchor system and the harness system could be separately customized for specific applications, allowing the consumer to mix and match an appropriate anchor system with an appropriate harness system.

Figure 6:
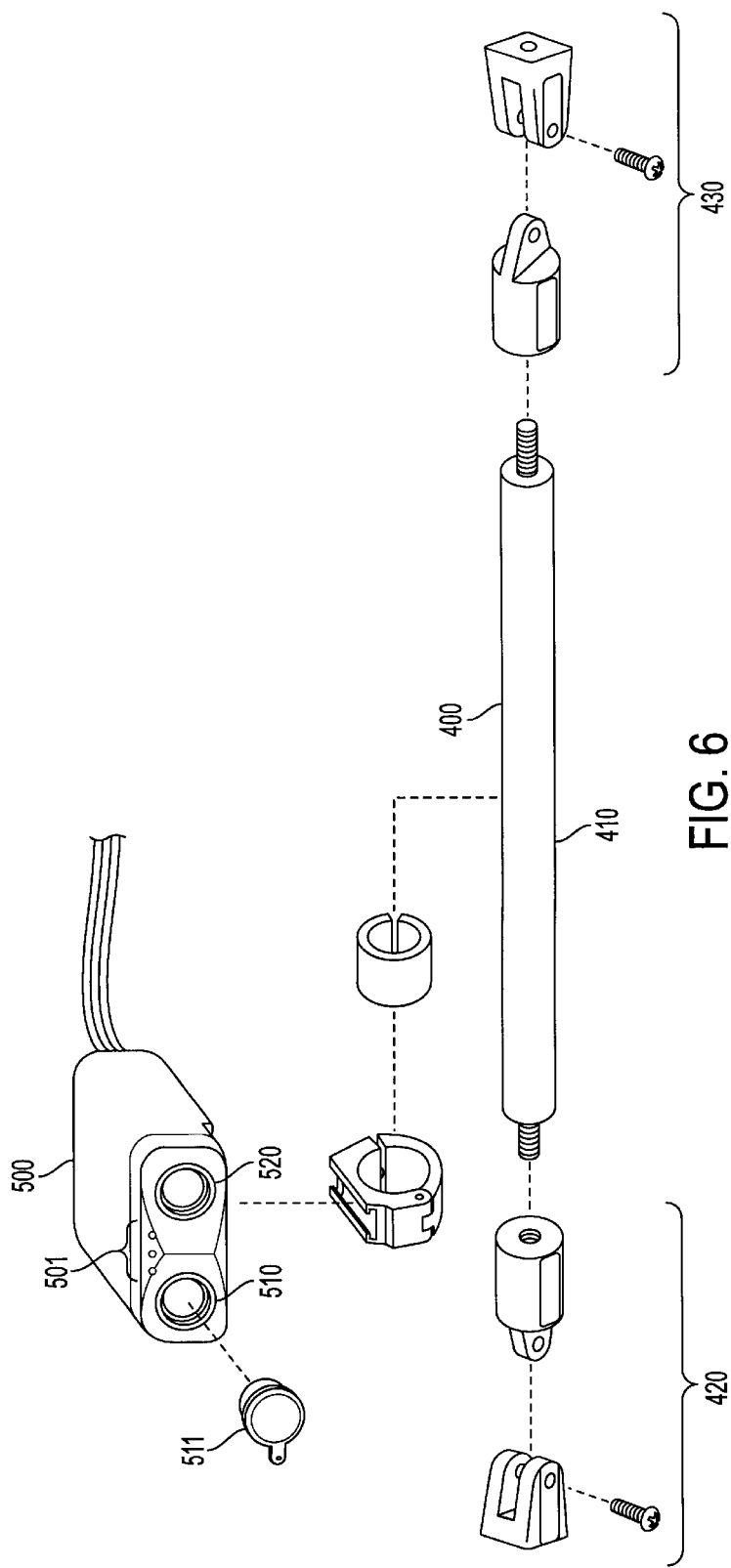
FIG. 6 is an exploded, schematic view of an accessory bar and components which may be mounted thereto to facilitate using portable electronic device on vehicles.

Powering of the PED unit while mounted on the vehicle can be facilitated through the accessory bar 400 which is best illustrated in FIGS. 2, 3 and 6. The accessory bar 400 is mounted to the motorcycle in the vicinity of the instrument gauges. Each end of the accessory bar 400 is attached to a part of the motorcycle such as the handlebars, the fairing, etc. A power outlet 510, permanently electrically connected to the motorcycle's electrical power system through a power cord (see FIG. 6), can be mounted on the accessory bar 400. A power cord and plug (see FIG. 2) extending from the PED cabinet 100 can be plugged into the power outlet 510 to electrically connect the PED 110 to the motorcycle's electrical system. When the PED cabinet 100 is removed from the motorcycle, the power cord can be easily and quickly unplugged from the power outlet 510.

In the illustrated embodiment, there are two power outlets 510, 520 housed in single power outlet housing 500. The power outlet housing 500 also contains a clamping mechanism (see FIG. 6) for securely holding the power outlet housing 500 onto the accessory bar 400. Any desired mechanism could be used to clamp or otherwise hold the power outlet housing 500 securely to the accessory bar 400, and the power outlet housing 500 could be of any desired shape or configuration.

The illustrated embodiment of the power outlet housing 500 also includes a battery charge meter 501. The battery charge meter 501 measures the remaining electrical charge present in the motorcycle's battery and visually displays the measurement to the operator through multi-colored LEDs. There may be times when the PED 110 is used when the motorcycle is not turned on. This is, of course, possible if the power outlet 510 is connected to the motorcycle's electrical system so as not to be dependent upon the motorcycle's ignition key position. However, if the PED 110 is used when the motorcycle is not turned on, the battery will eventually discharge. The battery charge meter 501 can warn the operator before the battery has discharged to such a level that the motorcycle will not start.

As with all other components of the mounting system, the power outlet 510 is weatherproofed so that the elements will not deteriorate or interfere with the functioning of the system. The power outlet housing 500 is weatherproofed. The power outlets 510, 520 themselves can include a sealing cover 511. The sealing cover 511 can be attached to the power outlet housing 500 with a lanyard, if desired, and is insertable into the opening of the outlet when it is not in use to prevent rain, dust, etc. from penetrating the interior of the outlet. The power outlets 510, 520 can also be further weatherproofed so that if rain does reach the interior of the outlet, it will not be able to penetrate the power outlet housing 500.

While the illustrated embodiment has the power outlet housing 500 mounted to the accessory bar 400, the power outlet housing 500 may also be mounted to the PED cabinet 100. In fact, the power outlets 510, 520 themselves may be integrally formed with or mounted on the PED cabinet 100, as desired.

As an after-market component, the accessory bar 400 should be adapted to fit as many different motorcycles and as many different mounting configurations on these motorcycles as may be desired. To this end, the overall length of the accessory bar 400 can be made adjustable. With reference to FIG. 6, in the illustrated embodiment, the accessory bar 400 comprises a hollow, elongated tube 410 with first and second pivot castings 420, 430 threaded to each end of the tube 410. By turning one of the pivot castings 420, 430 relative to the tube 410, the threads cause the pivot casting to move away from or toward the tube, thus expanding or contracting the overall length of the accessory bar 400. The pivot castings 420, 430 comprise two or more components hinged to one another, or connected to one another in some other desired manner, to allow for movement between the components. The pivot castings 420, 430 include connection means on the ends thereof which could include clamps or other mechanisms for attaching the pivot castings to some component of the motorcycle. For example, in the illustrated embodiment, the pivot castings have a threaded hole which accepts a threaded fastener. The threaded fastener passes through the motorcycle's fairing and then threads into the pivot casting to firmly attach each pivot casting 420, 430, and thus the accessory bar, to the motorcycle.

In addition to and separate from its role in supporting the power outlet housing 500, the accessory bar 400 is also useful for mounting PEDs directly thereon. Because of its location on the motorcycle and the manner in which it is securely attached to the motorcycle, it may be particularly desirable to mount on the accessory bar a radar detector, a GPS reader, a phone charger, a video camera etc. Some motorcycle enthusiasts have found it enjoyable to mount a video camera to their helmets or motorcycle to record their driving on a particularly winding or fast road. PEDs can be permanently mounted to the accessory bar for security (to prevent theft) or they can be detachably mounted. Many PEDs already include some capability to mount the PED to a wall in a house, a tripod, a dashboard, etc. It would be a fairly simple task to provide an adapter for such a PED which permits the PED to be mounted thereto without modification and which also includes some clamping mechanism for mounting to the accessory bar.

I claim:

1. A portable electronic device (PED) detachable mounting system for detachably mounting a PED to one of a motorcycle, a snowmobile, a personal watercraft, a personal three- or four-wheeled off-road vehicle, or other similar vehicle, the PED detachable mounting system comprising:
   a PED cabinet comprising:
      a weatherproofed, protective outer shell;
      a PED enclosed within the outer shell such that the PED is rendered weatherproof thereby; and
      at least one speaker adjustably mounted to the outer shell such that the direction of sound emittance from the at least one speaker can be adjusted to a plurality of positions while the at least one speaker remains mounted to the outer shell; and
   a harness system adapted to detachably secure the PED cabinet to a vehicle selected from the group consisting of a motorcycle, a snowmobile, a personal watercraft, a personal three- or four-wheeled off-road vehicle, or other similar vehicle.

2. The PED detachable mounting system of claim 1 wherein the outer shell is constructed of a hard, non-deformable material.

3. The PED detachable mounting system of claim 1 wherein the harness system comprises:
   a harness pad;
   a first strap attached to the harness pad which wraps around the PED cabinet and presses against a top surface of the outer shell, the first strap holding a bottom surface of the outer shell opposite the top surface against the harness pad; and
   a second anchor strap attached to the harness pad at a first end, and attached to the vehicle at a second end.

4. The PED detachable mounting system of claim 3 wherein the harness system further comprises:
a third anchor strap attached to the harness pad at a first end, and attached to the vehicle at a second end.

5. The PED detachable mounting system of claim 4 wherein the at least one speaker comprises at least two speakers.

6. A mounting system for detachably mounting a portable electronic device (PED) to a vehicle, comprising:
a PED cabinet comprising:
a weatherproofed, protective outer shell; and
a PED enclosed within the outer shell such that the PED is rendered weatherproof thereby;
a harness pad adapted to detachably mount the PED cabinet to the harness pad; and
an anchor system comprising:
a first anchor strap adapted to be secured to a first position on a vehicle, the first anchor strap being further adapted to be releasably secured to the harness pad; and
a second anchor strap adapted to be secured to a second position on the vehicle, the second anchor strap being further adapted to be releasably secured to the harness pad,
wherein the PED cabinet may be detached from the vehicle leaving only the harness pad and the anchor system attached to the vehicle, and the PED cabinet and the harness pad can be detached together from the vehicle leaving only the anchor system attached to the vehicle.

7. The mounting system of claim 6 further comprising:
a first strap secured at each end to the harness pad, the first strap wrapping around the PED cabinet and pressing against a top surface of the outer shell, the first strap holding a bottom surface of the outer shell opposite the top surface against the harness pad.

8. The mounting system of claim 6 wherein when the anchor system and the harness pad are attached to the vehicle, the first anchor strap can pull on the harness pad in a first direction, and the second anchor strap can pull on the harness pad in a second direction opposite the first direction.

9. The mounting system of claim 8 further comprising:
a first strap secured at each end to the harness pad, the first strap wrapping around the PED cabinet and pressing against a top surface of the outer shell, the first strap holding a bottom surface of the outer shell opposite the top surface against the harness pad.

10. The combination of the mounting system of claim 6 and a motorcycle having a gas tank, a triple clamp positioned forward of the gas tank, and a seat positioned rearward of the gas tank, wherein the first anchor strap is attached to the motorcycle forward of the motorcycle's gas tank in the vicinity of the triple clamp.

11. The combination of claim 10 wherein the second anchor strap is attached to the motorcycle rearward of the motorcycle's gas tank in the vicinity of the seat.

12. The combination of claim 11 wherein the mounting system further comprises:
a first strap secured at each end to the harness pad, the first strap wrapping around the PED cabinet and pressing against a top surface of the outer shell, the first strap holding a bottom surface of the outer shell opposite the top surface against the harness pad; and
the harness pad is positioned on the motorcycle's gas tank.

13. A mounting system for securing a portable electronic device (PED) to a vehicle comprising:
a PED cabinet comprising:
a weatherproofed, protective outer shell; and
a PED enclosed within the outer shell such that the PED is rendered weatherproof thereby; and
a harness system comprising:
a harness base adapted to be releasably secured to a vehicle, a bottom surface of the outer shell lying on the base; and
a first strap attached to the harness base, the first strap passing over a top surface of the outer shell which is opposite the bottom surface thereof such that when the PED cabinet is mounted to the harness base the first strap holds the PED cabinet on the harness base.

14. The mounting system of claim 13 wherein when the PED cabinet is mounted to the harness base, the first strap pushes down on the outer shell to push the bottom surface of the outer shell against the harness base.

15. The mounting system of claim 14 further comprising:
a second strap mounted at a first end thereof to the harness pad and at a second end thereof to the first strap; and
a third strap mounted at a first end thereof to the harness pad and at a second end thereof to the first strap;
wherein when the PED cabinet is mounted to the harness base, the second strap and the third strap each wrap around a back surface of the outer shell.

16. The mounting system of claim 15 wherein a buckle is interposed on the first strap to release the first strap from wrapping around the outer shell.

17. A combination of a motorcycle and an accessory mounting bar having at least one power outlet attached thereto, the combination comprising:
a motorcycle;
a bar having an adjustable length, the bar comprising a first end mounted to the motorcycle, and a second end mounted to the motorcycle; and
at least one power outlet mounted to the bar, the power outlet being connected to an electrical power system of the motorcycle.

18. The combination of claim 17 further comprising:
a portable electronic device (PED) having a clamping mechanism, the clamping mechanism detachably mounting the PED to the bar, and the power outlet being further connected to a plug which delivers electrical power from the power outlet to the PED.

19. The combination of claim 18 wherein the at least one power outlet comprises two power outlets, and wherein each power outlet is housed in a power outlet housing and the power outlet housing is mounted to the bar.

20. The combination of claim 19 further comprising a battery meter mounted to the power outlet housing configured to signal to an operator of the motorcycle the charge remaining in a battery for powering the motorcycle.

21. The combination of claim 19 further comprising a cover insertable into one of the power outlets for preventing damaging debris from entering the power outlet.

22. The combination of claim 18 wherein the bar further comprises:
a first pivot casting mounted on a first end of the bar; and
a second pivot casting mounted on a second end of the bar;
wherein each pivot casting can rotate with respect to the bar to adjust the overall length of the bar, and each pivot casting comprises a hinged joint.

23. The combination of claim 17 wherein the at least one power outlet comprises two power outlets, and wherein each power outlet is housed in a power outlet housing and the power outlet housing is mounted to the bar.

24. The combination of claim 23 further comprising a battery meter mounted to the power outlet housing configured to signal to an operator of the motorcycle the charge remaining in a battery for powering the motorcycle.

25. The combination of claim 23 further comprising a cover insertable into one of the power outlets for preventing damaging debris from entering the power outlet.

26. The combination of claim 17 wherein the bar further comprises:

a first pivot casting mounted on a first end of the bar; and a second pivot casting mounted on a second end of the bar;

wherein each pivot casting can rotate with respect to the bar to adjust the overall length of the bar, and each pivot casting comprises a hinged joint.

27. A method of utilizing portable electronic devices (PEDs) on a motorcycle comprising the steps of:

attaching an accessory bar to a motorcycle;

attaching an outlet to the accessory bar;

electrically connecting the outlet to an electrical system of the motorcycle; and electrically connecting a PED to the outlet to provide power to the PED.

28. The method of claim 27 further comprising the step of adjusting the length of the accessory bar to an appropriate length for the motorcycle before the step of attaching the accessory bar to the motorcycle.

29. The method of claim 27 further comprising the step of mounting the PED to the accessory bar.

30. The method of claim 27 further comprising the step of mounting the PED to the motorcycle with a harness system.

31. The method of claim 27 wherein the step of attaching the accessory bar to the motorcycle further comprises the steps of attaching a first end of the accessory bar to a fairing of the motorcycle and attaching a second end of the accessory bar to the fairing.

\* \* \* \* \*